US012282946B2

(12) United States Patent
Al Jadda et al.

(10) Patent No.: US 12,282,946 B2
(45) Date of Patent: Apr. 22, 2025

(54) COMPLEMENTARY ITEM RECOMMENDATIONS BASED ON MULTI-MODAL EMBEDDINGS

(71) Applicant: Home Depot Product Authority, LLC, Atlanta, GA (US)

(72) Inventors: Khalifeh Al Jadda, Suwanee, GA (US); Unaiza Ahsan, Atlanta, GA (US); San He Wu, Smyrna, GA (US); Huiming Qu, Atlanta, GA (US)

(73) Assignee: Home Depot Product Authority, LLC, Atlanta, GA (US)

( * ) Notice: Subject to any disclaimer, the term of this patent is extended or adjusted under 35 U.S.C. 154(b) by 411 days.

(21) Appl. No.: 17/011,543

(22) Filed: Sep. 3, 2020

(65) Prior Publication Data
US 2021/0073891 A1    Mar. 11, 2021

Related U.S. Application Data

(60) Provisional application No. 62/896,383, filed on Sep. 5, 2019.

(51) Int. Cl.
*G06Q 30/0601* (2023.01)
*G06F 16/9038* (2019.01)
*G06F 16/906* (2019.01)

(52) U.S. Cl.
CPC ..... *G06Q 30/0631* (2013.01); *G06F 16/9038* (2019.01); *G06F 16/906* (2019.01); *G06Q 30/0629* (2013.01); *G06Q 30/0643* (2013.01)

(58) Field of Classification Search
CPC .............. G06F 16/9038; G06F 16/906; G06Q 30/06–0645; G06Q 30/08; G06Q 50/01; G16Y 10/00–90
See application file for complete search history.

(56) References Cited

U.S. PATENT DOCUMENTS 7,593,602 B2 *  9/2009  Stentiford .............. G06F 16/58
                                                707/999.001
8,996,527 B1    3/2015  Leung et al.
(Continued)

FOREIGN PATENT DOCUMENTS

CA              2813644 A1 *  1/2006  ............. G06F 16/31
WO     WO-2012110754 A1 *  8/2012  ........... G06T 11/001

OTHER PUBLICATIONS

Cardoso, et al., "Product Characterisation towards Personlisation: Learning Attributes from Unstructured Data to Recommend Fashion Products," Applied Data Science Track Paper; KDD 2018, Aug. 19-23, London, UK; Association for Computing Machinery, Aug. 2018, 9pp. (Year: 2018).*

(Continued)

Primary Examiner — Adam L Levine
(74) Attorney, Agent, or Firm — Greenberg Traurig, LLP (57) ABSTRACT

Systems and methods for providing suggestions of complementary products responsive to an anchor product are disclosed. The method includes receiving a selection of an anchor product. A similarity score between text embeddings of the anchor product and text embeddings of a plurality of products in a product database is calculated. A similarity score between an image feature of the anchor product and an image feature of the plurality of products in the product database is calculated. A weighted score between the two similarity scores as calculated for the anchor product and the plurality of products in the product database is calculated. At least one of the products from the product database having a highest weighted score is selected and returned responsive to the selection of the anchor product.

20 Claims, 5 Drawing Sheets

(56) References Cited

U.S. PATENT DOCUMENTS

| | | | |
|---|---|---|---|
| 10,715,862 B2* | 7/2020 | Li | H04N 21/488 |
| 2004/0039657 A1 | 2/2004 | Behrens et al. | |
| 2007/0058858 A1 | 3/2007 | Harville et al. | |
| 2010/0268661 A1* | 10/2010 | Levy | G06Q 30/02 705/347 |
| 2011/0307294 A1 | 12/2011 | Barkai et al. | |
| 2015/0095185 A1 | 4/2015 | Katukuri et al. | |
| 2015/0100943 A1 | 4/2015 | Gabel et al. | |
| 2015/0178786 A1 | 6/2015 | Claessens | |
| 2017/0193582 A1 | 7/2017 | Guo et al. | |
| 2017/0193587 A1 | 7/2017 | Caster et al. | |
| 2017/0193588 A1* | 7/2017 | Loui | G06F 16/583 |
| 2017/0316486 A1 | 11/2017 | Barkan et al. | |
| 2018/0032882 A1* | 2/2018 | Joshi | G06N 20/00 |
| 2018/0047083 A1 | 2/2018 | Agarwal et al. | |
| 2018/0137551 A1 | 5/2018 | Zheng et al. | |
| 2018/0150879 A1 | 5/2018 | Vasile et al. | |
| 2018/0204113 A1 | 7/2018 | Galron et al. | |
| 2018/0247363 A1* | 8/2018 | Agarwal | G06Q 30/0629 |
| 2018/0300296 A1* | 10/2018 | Ziraknejad | G06F 16/93 |
| 2019/0095978 A1 | 3/2019 | Gabbai | |
| 2019/0130285 A1 | 5/2019 | Snyder et al. | |
| 2019/0236679 A1 | 8/2019 | Kumar et al. | |
| 2019/0286656 A1 | 9/2019 | Yerva et al. | |
| 2019/0297039 A1 | 9/2019 | Rodriquez et al. | |
| 2019/0311301 A1 | 10/2019 | Pyati | |
| 2019/0340649 A1 | 11/2019 | Ayush et al. | |
| 2019/0362233 A1 | 11/2019 | Aizawa et al. | |
| 2019/0370879 A1 | 12/2019 | Bhattacharjee | |
| 2019/0378204 A1 | 12/2019 | Ayush et al. | |
| 2020/0074242 A1 | 3/2020 | Chen et al. | |
| 2021/0256588 A1* | 8/2021 | Moosaei | G06Q 30/0631 |

OTHER PUBLICATIONS

Johnson et al., "Billion-scale similarity search with GPUs," arXiv e-prints, Feb. 2017, 12pp. (Year: 2017).*

Angelo Cardoso; Fabio Daolio; Saul Vargas, Product Characterisation towards Personlisation: Learning Attributes from Unstructured Data to Recommend Fashion Products, Applied Data Science Track Paper; KDD 2018, August 19-23, London, UK; Published Aug. 2018 by Association for Computing Machinery; ACM ISBN 978-1-4503-5552-0/18/08, Date of Publication: Aug. 2018, 9 pgs.

Haitian Zheng; Kefei Wu; Jong-Hwi Park; Wei Zhu; Jiebo Luo, Personalized Fashion Recommendation from Personal Social Media Data: An item-to-Set Metric Learning Approach, ACMMM 2020; Oct. 12-16, 2020, Seattle WA; arXiv preprint arXiv:2005.12439, Date of Publication: May 25, 2020, 9 pgs.

ISA/US, International Search Report and Written Opinion issued in PCT/US20/49439, dated Nov. 30, 2020, 9 pgs.

* cited by examiner

COMPLEMENTARY ITEM RECOMMENDATIONS BASED ON MULTI-MODAL EMBEDDINGS

CROSS-REFERENCE TO RELATED APPLICATION

This application claims the benefit of priority to U.S. Provisional Application No. 62/896,383, filed on Sep. 5, 2019, and titled "COMPLEMENTARY ITEM RECOMMENDATIONS BASED ON MULTI-MODAL EMBEDDINGS," which is hereby incorporated by reference in its entirety.

TECHNICAL FIELD

This disclosure generally relates to determination of complementary item recommendations that may be provided responsive to a user selection of an item. More specifically, this disclosure relates to determination of complementary item recommendations based on text and images.

BACKGROUND

Items, such as products or services, may be searched for by users of an electronic interface, such as an e-commerce website. In response to user searches for or selections of items, complementary items may be recommended to the user to enable to user to find items that may be used together in an aesthetically or functionally complementary fashion.

SUMMARY

A method is disclosed. The method includes receiving, by a product recommendation system, an anchor product. The product recommendation system calculates a similarity score between text embeddings of the anchor product and text embeddings of a plurality of products in a product database. The product recommendation system calculates a similarity score between an image feature of the anchor product and an image feature of the plurality of products in the product database, wherein the image feature includes a red-green-blue (RGB) color histogram on the image. The product recommendation system calculates a weighted score between the two similarity scores as calculated for the anchor product and the plurality of products in the product database. The product recommendation system determines at least one of the products from the product database having a highest weighted score. The product recommendation system returns the at least one of the products as selected responsive to the anchor product as received.

Another method is disclosed. The method includes obtaining training data. A training module trains a machine learning model with the training data as obtained. Text embeddings are generated for a plurality of products from the trained model by the training module. The training module also generates visual feature vectors for the plurality of products.

In an embodiment, the trained network is used in a method for recommending one or more complementary products in response to receipt of an anchor product.

A system is also disclosed. The system includes a processor and a memory storing instructions that, when executed by the processor, cause the system to perform a method. The method includes receiving, by a product recommendation system, an anchor product. The product recommendation system calculates a similarity score between text embeddings of the anchor product and text embeddings of a plurality of products in a product database. The product recommendation system calculates a similarity score between an image feature of the anchor product and an image feature of the plurality of products in the product database, wherein the image feature includes a red-green-blue (RGB) color histogram on the image. The product recommendation system calculates a weighted score between the two similarity scores as calculated for the anchor product and the plurality of products in the product database. The product recommendation system determines at least one of the products from the product database having a highest weighted score. The product recommendation system returns the at least one of the products as selected responsive to the anchor product as received.

A non-transitory, computer-readable memory storing instructions that, when executed by a processor, cause the processor to perform a method is disclosed. A method is disclosed. The method includes receiving, by a product recommendation system, an anchor product. The product recommendation system calculates a similarity score between text embeddings of the anchor product and text embeddings of a plurality of products in a product database. The product recommendation system calculates a similarity score between an image feature of the anchor product and an image feature of the plurality of products in the product database, wherein the image feature includes a red-green-blue (RGB) color histogram on the image. The product recommendation system calculates a weighted score between the two similarity scores as calculated for the anchor product and the plurality of products in the product database. The product recommendation system determines at least one of the products from the product database having a highest weighted score. The product recommendation system returns the at least one of the products as selected responsive to the anchor product as received.

Another method is disclosed. The method includes receiving, by a product recommendation system, a selection of an anchor product. The product recommendation system calculates a cosine similarity score between text embeddings of the anchor product and text embeddings of a plurality of products in a product database. The product recommendation system calculates a cosine similarity score between an image feature of the anchor product and an image feature of a first subset of the plurality of products in the product database. The product recommendation system calculates a combined score between the two cosine similarity scores as calculated for the anchor product and the first subset of the plurality of products in the product database. At least one of the products from the product database having a highest combined score is selected. The at least one of the products as selected responsive to the selection of the anchor product is returned by the product recommendation system.

BRIEF DESCRIPTION OF THE DRAWINGS

References are made to the accompanying drawings that form a part of this disclosure and illustrate embodiments in which the systems and methods described in this Specification can be practiced.

DETAILED DESCRIPTION

Recommendation systems are often significant components of online retail. The recommendation systems can be used to identify additional products to a customer for consideration when the customer is making an online purchase. There are several categories of recommendations, including alternative product recommendations and complementary product recommendations. Alternative product recommendations include products that are similar to an anchor product and are typically straightforward to determine. Complementary product recommendations present more of a challenge as it can be more difficult to decide what products match in style and relevance to the anchor product.

Known methods of determining complementary products, which complementary products may be provided as complementary product recommendations to users, may require a large amount of baseline data or may be manually-defined. As a result, known methods may not automatically determine complementary items based on a relatively small amount of baseline data.

The remainder of this disclosure will refer to determining complementary products and providing complementary product recommendations. It should be understood that the teachings of the instant disclosure may find use with other types of items (i.e., items other than products).

An "anchor product," as used herein, includes a selected product. The product may be selected by, for example, a user of an online retailer's website. The anchor product can be used to identify one or more complementary products that relate to the anchor product.

A "complementary product," as used herein, includes products that relate to an anchor product in a meaningful way. Examples of how complementary products are related to an anchor product include, but are not limited to, relevance, usage, visual style, color, and attributes. By way of example, for a given anchor product such as a bathroom sink, the complementary products include, for example, a mirror, a towel bar, a towel ring, a bathtub, a toilet paper holder, or the like. The complementary products relate to the anchor product by matching style and are for use in the bathroom. In this manner, complementary products differ from alternative products.

A "collection," as used herein, is a group of "related" products. A collection can be crowd-sourced by online merchants for online retail. The collections coordinate with each other in terms attributes of brand, color, and style. The attributes may be an exact match. The attributes can alternatively be similar but not an exact match.

An "alternative product," as used herein, is an item that is similar (e.g., functionally similar) to an anchor product (e.g., a substitute for the anchor product). Alternative products may alternatively be referred to as substitute products or the like. Alternative products differ from complementary products in their relationship to the anchor product.

A "text attribute," as used herein, includes a textual descriptor of a product. Examples of textual descriptors include, but are not limited to, titles of a product, descriptions of a product, brand name of a product, model name or number of a product, size, or the like.

An "image attribute," as used herein, includes a visual descriptor of a product in an image. Examples of visual descriptors include, but are not limited to, a red, green, blue (RGB) color histogram indicative of coloring of the product in the image, color finishing of the product in the image, style, or the like.

Figure 1:
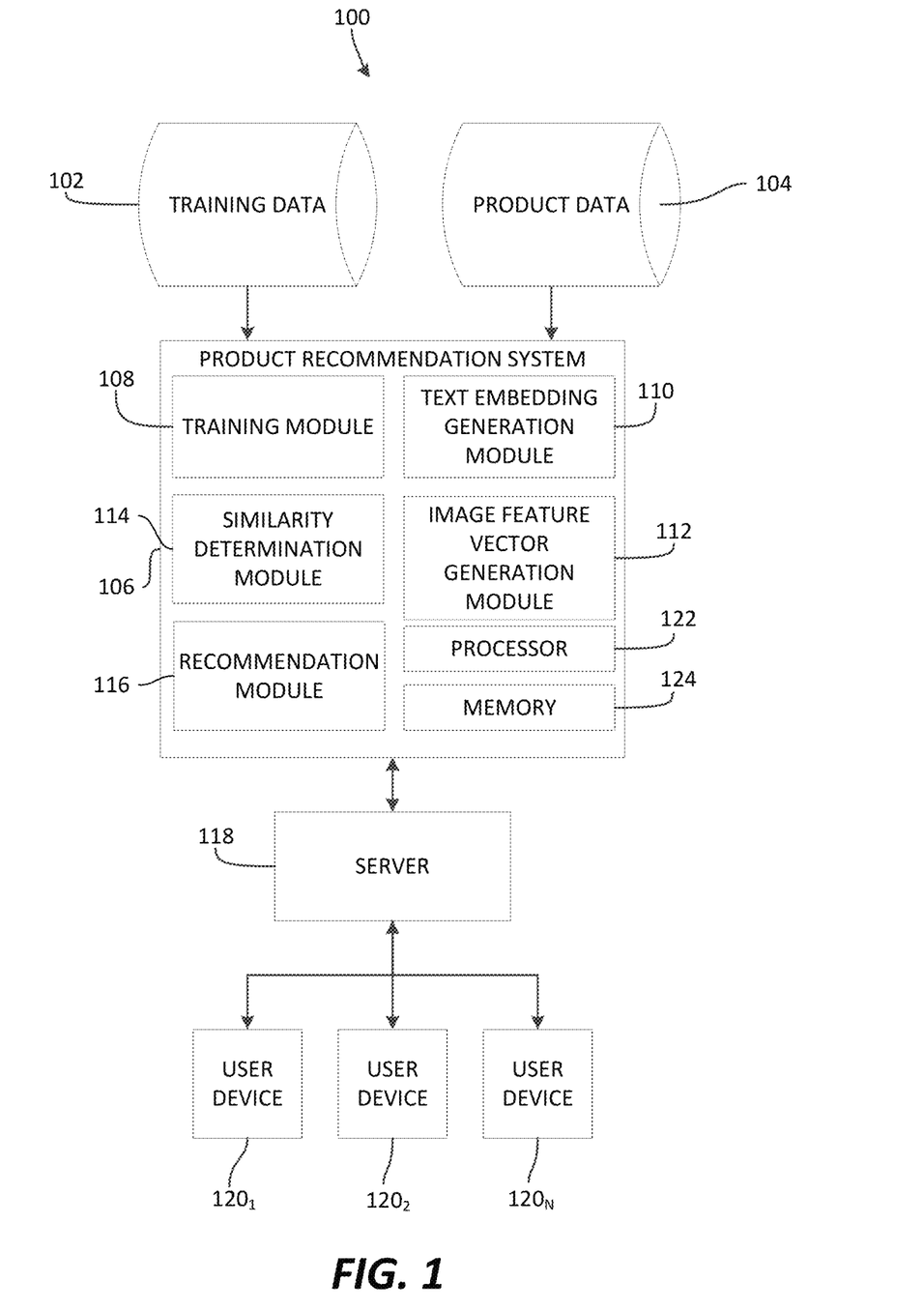
FIG. 1 is a diagrammatic view of an example system for determining and providing complementary product recommendations, according to an embodiment.

Referring now to the drawings, wherein like numerals refer to the same or similar features in the various views, FIG. 1 is a diagrammatic view of an example system 100 for determining and providing complementary product recommendations, according to an embodiment.

The system 100 may be used to determine products that are complementary to other products (e.g., to an anchor product), and to provide recommendations to users of an electronic interface (such as a website) of products that are complementary to products selected by the users through the interface. The system 100 may implement some or all of the functionality or processes described in FIGS. 2-4 below.

The system 100 may include a database 102 of training data, a database 104 of product data, and a product recommendation system 106 that may include one or more functional modules 108, 110, 112, 114, 116 embodied in hardware, software, or a combination of hardware and software. In an embodiment, the functional modules 108, 110, 112, 114, 116 of the product recommendation system 106 may be embodied in a processor 122 and a memory 124 storing instructions that, when executed by the processor 124, cause the processor 124 to perform the functionality of one or more of the functional modules 108, 110, 112, 114, 116, other functionality of this disclosure, or combinations thereof.

The functional modules 108, 110, 112, 114, 116 of the product recommendation system 106 may include a training module 108 that is configured to train one or more machine learning models using training data obtained from the database 102 or another store of training data. The training data may be or may include manually-defined collections, in some embodiments. For example, the training data may include manually-defined (e.g., defined by a merchant) collections of products carried by the retailer's website. The training data can include both a plurality of positive examples of such relationships (e.g., products that are in a manually-defined collection together) and a plurality of negative examples of such relationships (e.g., products that are not in a manually-defined collection with each other). The training data may also include text attributes (e.g., product descriptions, names, etc.).

The training module 108 may train a machine learning model such as a Siamese network having Bidirectional LSTM (long short-term memory) components, or another machine learning tool type. After training, the machine learning model may determine the similarity of two products to each other based on input product information respective of those products. For example, the input product information can include an anchor product having text attributes and image attributes, both of which are used to determine the similarity of the anchor product and another product from the product data database 104. In an embodiment, the similarity of the two products can include (1) a textual similarity component and (2) an image similarity component. In an embodiment, the textual similarity component and the image similarity component can be computed using cosine similarity. In an embodiment, the image attribute can include a red, green, blue (RGB) color histogram.

LSTMs sequentially update a hidden unit. In this manner, LSTMs have some similarity to recurrent neural networks (RNNs). However, an important distinction in an LSTM is that a hidden layer (q) is replaced by a memory cell with several gates where σ is a logistic sigmoid function. The sigmoid controls how much information flows from one gate to the other. Equations 1-4 depict gates $i_t$ (input gate), $f_t$ (forget gate), $o_t$ (output gate), and $c_t$ (cell gate). Ws are weight matrices and ⊗ is a Hadamard (element wise) product, $h_{t-1}$ (Eq. 5) refers to the output at previous timestep t−1.

$$i_t = \tanh(W_{xi}x_t + W_{hi}h_{t-1} + b_i) \quad (1)$$

$$f_t = \sigma(W_{xf}x_t + W_{hf}h_{t-1} + b_f) \quad (2)$$

$$o_t = \sigma(W_{xo}x_t + W_{ho}h_{t-1} + b_o) \quad (3)$$

$$c_t = f_t \otimes c_{t-1} + i_t \otimes j_t \quad (4)$$

$$h_t = \tanh(c_t) \otimes o_t \quad (5)$$

Bidirectional LSTMs compute hidden states both in the forward direction and the backward direction, then combine the two and pass through the output layer.

Siamese networks are multi-branch networks with shared weights that usually have inputs in the form of $(a_i, b_i, y_i)$, where $a_i$ and $b_i$ are feature representations of two products a and b and $y_i$ is a measure of similarity between them. If they belong to the same collection, $y_i=1$, otherwise $y_i=0$. A cosine similarity layer is used to learn the embeddings (instead of a usual contrastive loss layer).

Text embedding generation module 110 may include the machine learning model trained by the training module 108, or a portion of the model, in some embodiments. The text embedding generation module 110 may be configured to accept product information of a given product as input and to output embeddings (e.g., a vector description) respective of that product. In some embodiments, the text embedding generation module 110 may be the machine learning model trained by the training module 108, with the comparison layer of the model removed, ignored, or bypassed. In some embodiments, the product recommendation system 106 may apply the text embedding generation module 110 to product data respective of a plurality of products from the product data database 104, in some embodiments, to generate embeddings respective of each of those products. In some embodiments, the text embedding generation module 110 may generate embeddings for thousands, tens of thousands, hundreds of thousands, millions, or more products.

The product recommendation system 106 may further include an image feature vector generation module 112. The image feature vector generation module 112 may be configured to accept one or more images of a product as input and to output a vector descriptive of the image, and thus descriptive of the product. In some embodiments, the image feature vector generation module 112 may be configured to generate a vector descriptive of the color content of the image. For example, the image feature vector generation module may extract a portion of the image, such as the foreground, and apply a color histogram to the extracted portion (e.g., foreground), in some embodiments, to generate a color feature vector. In some embodiments, the image feature vector generation module may apply a mean adaptive threshold function to an image to separate the foreground from the background. In other embodiments, additional and/or other visual feature vector types may be generated. In an embodiment, the color histogram includes eight (8) bins per channel to obtain a 512-dimensional feature vector as the image feature for each image. Other histogram types, dimensionalities, and sizes may be used.

The product recommendation system 106 may also include a similarity determination module 114 configured to determine the similarity between any two products based on text embeddings respective of those products (e.g., embeddings generated by the text embeddings generation module 110) and image feature vectors respective of those products (e.g., image feature vectors generated by the image feature vector generation module 112).

The similarity determination module 114 may apply a first cosine similarity function to the text embeddings respective of the two products and a second cosine similarity function to the image feature vectors respective of the two products. The text embedding and image feature vector cosine similarities may be combined with each other, in some embodiments, to determine an overall similarity of two products. For example, the text embedding and image feature vector cosine similarities may be respectively weighted and the weighted values may be mathematically combined. The respective weights applied to the text embedding and image feature vector cosine similarity values may be selected depending on the category of products. For example, products for which visual appearance is more important to purchasing decisions may have a relatively higher weight for the image feature vector cosine similarity. In contrast, features for which visual appearance is less important to purchasing decisions may have a relatively lower weight for the image feature vector cosine similarity.

Recommendation module 116 may be configured to receive a user selection of a product (e.g., an anchor product) and, based on the output of the similarity determination module 114, to provide one or more recommendations of products that are complementary to the user-selected product. Provision of an accurate and robust listing of complementary product(s) to the user may reduce the number of webpages or other interface portions that the user must access to find a set of products, thereby improving the user experience of the interface. Furthermore, by reducing the amount of navigation of the interface by the user, provision of an accurate and robust complementary product recommendations may reduce the computational burden of hosting the interface. In contrast, a lack of a complementary product recommendations, or an inaccurate or incomplete list of complementary product recommendations, may cause the user to further navigate the website or other interface to attempt to manually find one or more desired products that complement the anchor product.

The system 100 may further include a server 118 in electronic communication with the product recommendation system 106 and with a plurality of user computing devices $120_1, 120_2, \ldots 120_N$. The server 118 may provide a website, data for a mobile application, or other interface through which the users of the user computing devices 120 may view products having data in the product data database 104, complementary product recommendations provided by the product recommendation system 106, or other information that may be provided about the products. For example, the server 118 may provide an e-commerce website of a retailer that includes listings for one or more products such as the products included in the product data database 104.

In some embodiments, the server 118 may receive a product selection from a user, provide that product selection to the product recommendation system 106, receive one or more complementary product recommendations from the product recommendation system 106, and provide those complementary product recommendations to the user on a webpage or other interface portion respective of the product selected by the user.

Figure 2:
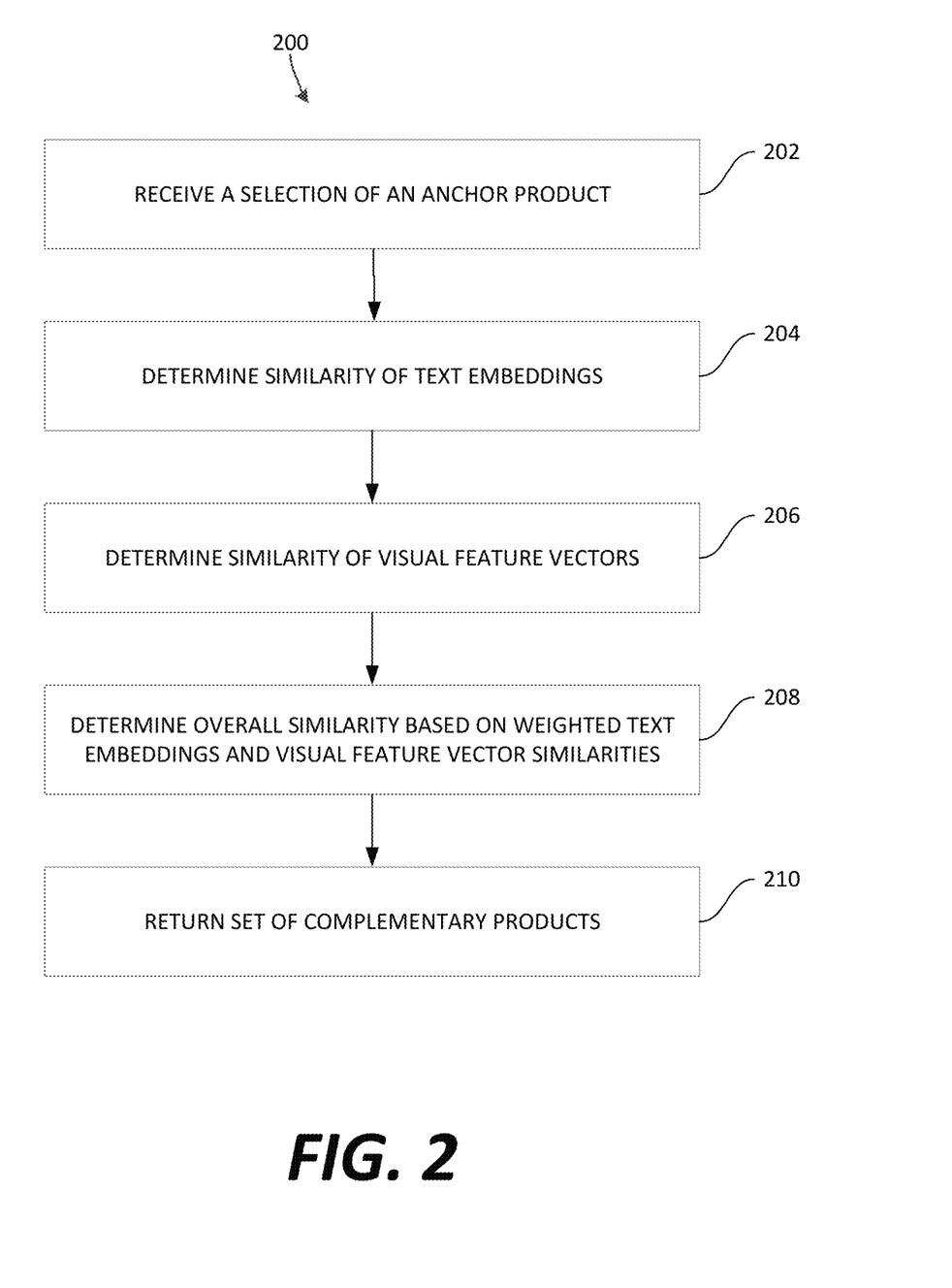
FIG. 2 is a flowchart illustrating an example method of determining and providing complementary product recommendations, according to an embodiment.

FIG. 2 is a flowchart illustrating an example method 200 of determining and providing complementary product recommendations, according to an embodiment. Referring to FIGS. 1 and 2, the method 200, or one or more portions thereof, may be performed by the product recommendation system 100.

The method 200 may include a block 202 that includes receiving a selection of an anchor product by the product recommendation system 100. In an embodiment, the anchor product may be selected by a user using one of the user devices 120. In an embodiment, the anchor product may be a product within a listing of search results and selected responsive to a user query in a user interface made available to the user devices 120 by the server 118. In an embodiment, the anchor product may be a product that is selected by the user via the user interface for reviewing additional details about the product.

The method 200 may further include a block 204 that includes determining the similarity of embeddings vectors to the other embeddings vectors. That is, each embeddings vector (e.g., text embeddings vectors as described in additional detail in accordance with FIG. 3 below) may be compared to each other embeddings vector, or a subset thereof, to determine the similarity of the two embeddings vectors to each other. The similarity of two embeddings vectors may be determined by using a cosine similarity function, for example. For example, a text embeddings vector for the anchor product can be compared with the text embeddings vectors for all other products in the product data database 104. In an embodiment, the text embeddings vector of the anchor product may be compared with text embeddings vectors of products having certain product types in the product data database 104. That is, in an embodiment, the number of text embeddings vectors for the comparison can be reduced by, for example, filtering based on a feature of the anchor product.

The method 200 may further include a block 206 that includes determining the similarity of visual feature vectors to the other visual feature vectors. That is, each visual feature vector may be compared to each other visual feature vector, or a subset thereof, to determine the similarity of the two visual feature vectors to each other. The similarity of two visual feature vectors may be determined by using a cosine similarity function, for example.

In some embodiments, block 206 may include determining the similarity of visual feature vectors of fewer products than were compared at block 204. For example, in some embodiments, for each product, the n most similar products based on text embeddings similarity at block 204 may be further compared for visual feature similarity at block 206, with n being less than the total number of products available for comparison. The method 200 may further include a block 208 that includes determining the overall similarity of the products to each other based on the embeddings similarities and the visual feature similarities determined at blocks 204 and 206. For example, the similarities respective of a two-product combination may be weighted respective to each other and mathematically combined to determine the overall similarity of the two products. The overall similarity of each product combination may be ranked for each potential product. Based on the overall similarities, a set of complementary products may be defined for each product. The set of complementary products may include the most similar product from each of a plurality of product categories that are related, in some embodiments.

The method 200 may further include a block 210 that includes returning the set of complementary products as determined. In an embodiment, returning the set of complementary products can include, for example, displaying the complementary products to the user of the user device 120 in conjunction with the display of an anchor product as selected or in conjunction with a listing of search results based on the user's search.

In some embodiments, the operations of blocks 204, 206, and 208 may be performed in an "offline" process in which the similarity of different products to each other is calculated and stored (e.g., in the memory 124 or other memory or storage). At runtime, blocks 202 and 210 may be performed, with block 210 including returning complementary products that are most similar according to the offline process.

In an example embodiment of the method 200, the cosine similarity is calculated between the anchor product's text embeddings and the text embeddings of all other products in the product data database 104. A list of the similarity scores is stored as a first list. The first list is sorted in descending order of cosine similarity scores and the top k scores are stored as a second list. The cosine similarity scores of the anchor product's color features are computed compared to the color features of all products in the second list. A weighted score is calculated between the two cosine similarities where a text weight value is the weight associated with the text-based score and an image weight value is the weight associated with the color-based score. The list of weighted scores is stored as a third list. The final weighted scores in the third list are sorted in descending order and the top m products with the highest weighted scores are selected and stored as a product list. This product list is output.

Figure 3:
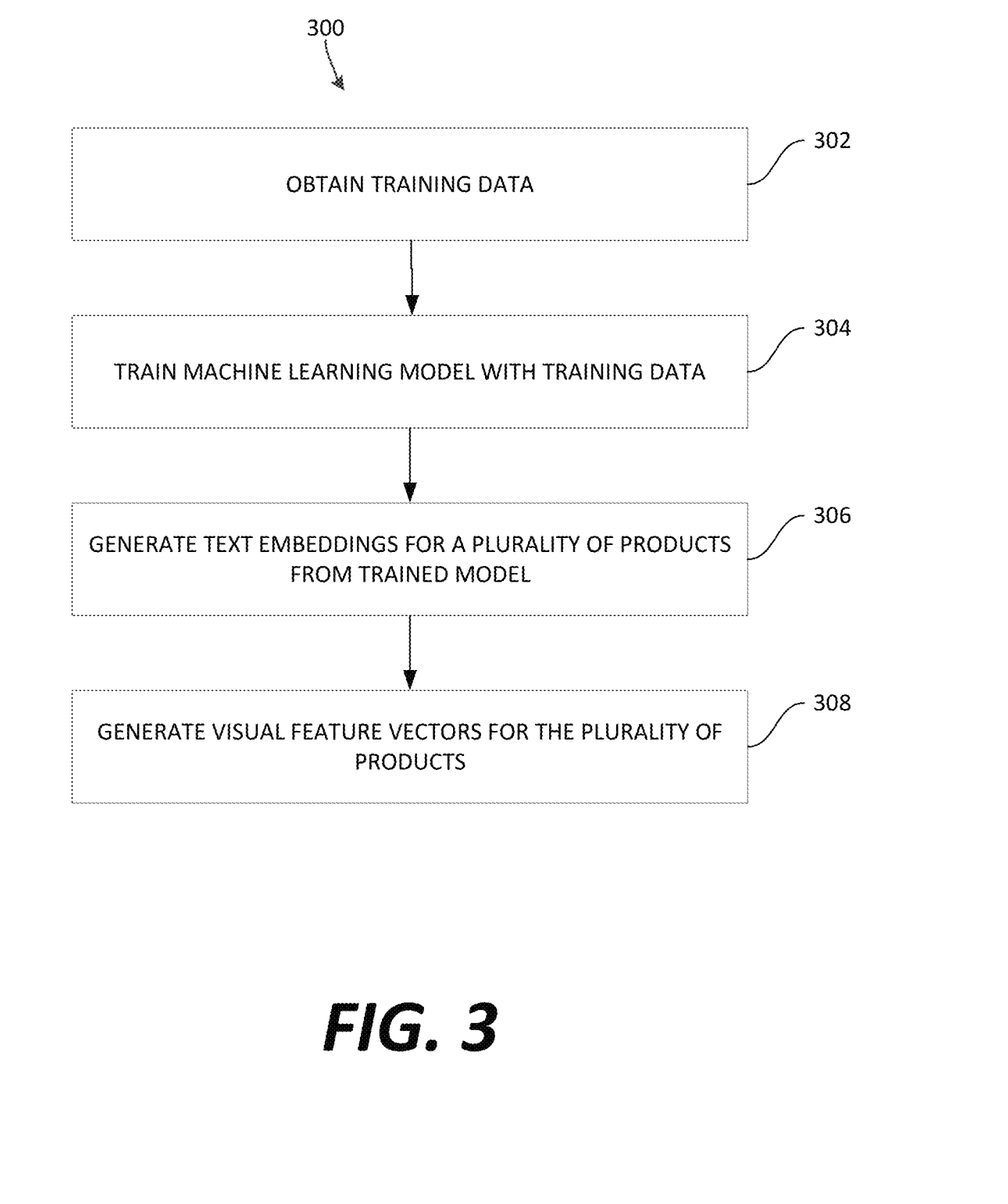
FIG. 3 is a flowchart illustrating an example method of training a ranking model for complementary product recommendations, according to an embodiment.

FIG. 3 is a flowchart illustrating an example method 300 of training a ranking model for complementary product recommendations, according to an embodiment. Referring to FIGS. 1 and 3, the method 300, or one or more portions thereof, may be performed by the product recommendation system 100.

The method 300 may include a block 302 that includes obtaining training data. In some embodiments, the training data may include a set of positive and negative examples of complementary products. The training data may include textual information respective of the compared products, in embodiments. The training data can include one or more collections of products (e.g., manually-defined or otherwise predefined collections).

The method 300 may further include a block 304 that includes training a machine learning model with the training data. The machine learning model can be a Siamese network, for example. Other types of machine learning models may be suitable, such as, but not limited to, a bidirectional encoder representation from transformer (BERT), generative pre-trained transformer 2 (GPT-2), generative pre-trained transformer 3 (GPT-3), fastText, Doc2Vec, Word2Vec, or the like.

The method 300 may further include a block 306 that includes generating text embeddings for a plurality of products (e.g., respective vector descriptions of text associated with each of those products). Embeddings may be generated with a machine learning model trained at block 304, based on product information (e.g., the product information stored in the product data database 104). Embeddings may be generated for thousands, tens of thousands, hundreds of thousands, millions, or more products. The generating text embeddings block 306 may result in a set of text embeddings vectors, with a single text embeddings vector per product.

The method 300 may further include a block 308 that includes generating visual feature vectors for a plurality of products (e.g., respective image feature vectors based on one or more respective images of each of those products). Visual feature vectors may be generated by color histograms of portions of the images, such as the foregrounds of the images, in some embodiments. The visual feature vectors may be generated for the same set of products as text embeddings were generated for in block 306, in an embodiment. The generating visual feature vectors block 308 may result in a set of visual feature vectors, with a single image feature vector per product.

The text embeddings vectors and the visual feature vectors from blocks 306, 308, can be used in the method 200 for providing one or more complementary products in response to receipt of an anchor product.

Figure 4:
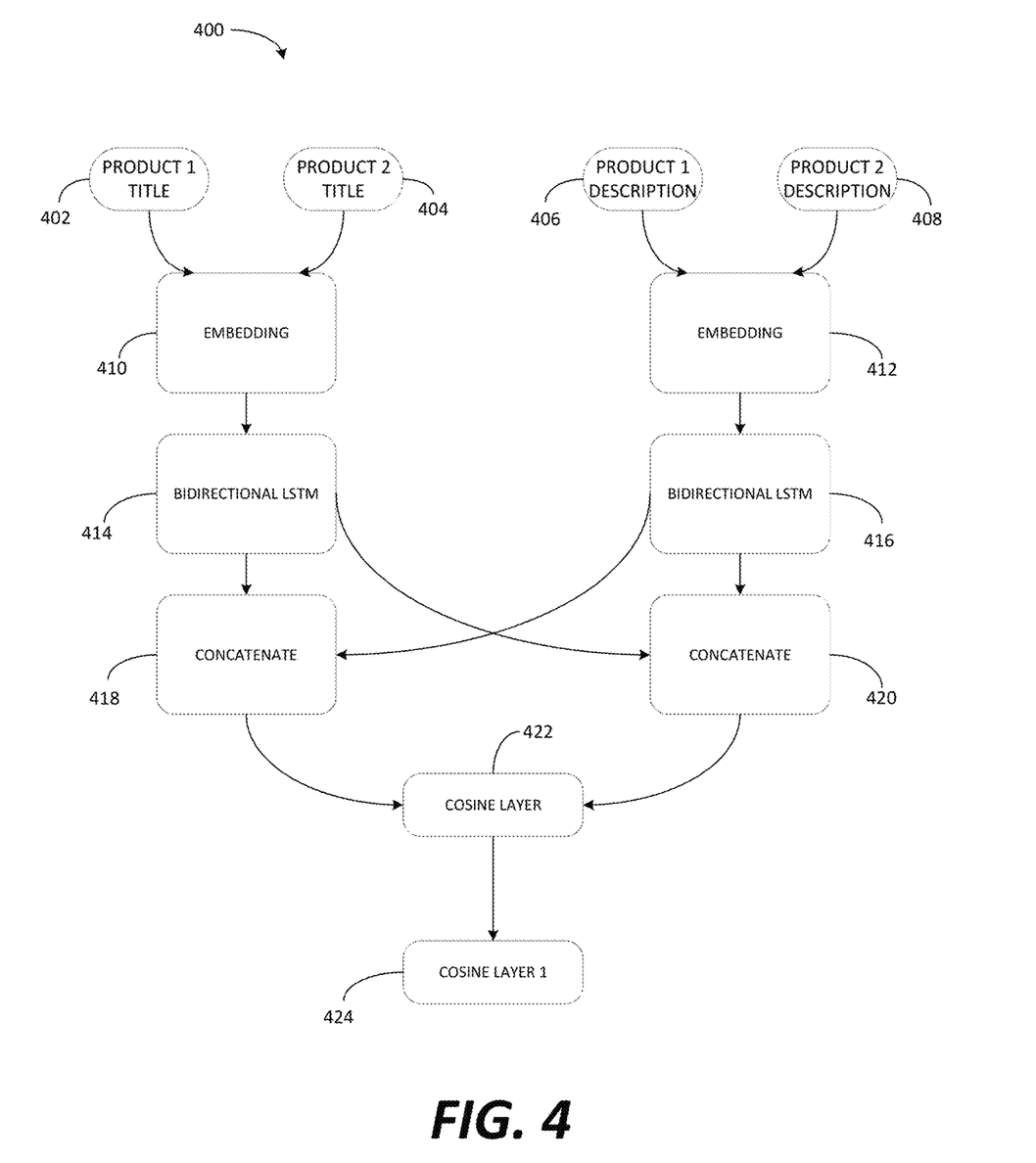
FIG. 4 is an example network architecture, according to an embodiment.

FIG. 4 is an example network architecture 400, according to an embodiment. The architecture 400 is representative of a two-stream network, with concatenation happening (blocks 418, 422) just before the cosine similarity layer (block 422). The product titles (blocks 402, 404) and product descriptions (blocks 406, 408) are embedded using the dense embedding layer (blocks 410, 412). This embedding then passes to the bidirectional LSTM layer (blocks 414, 416). The text-based embeddings are concatenated (blocks 418, 420) for each product in the pair. The pair, if similar (have label 1) goes through the cosine similarity layer (block 422) which pushes the features close together (or apart, depending on the label) and is supervised by binary cross entropy loss. Once the network 400 is trained, the network 400 can be used to generate text embeddings from the last layer of the network for each product's title and description (concatenated).

Figure 5:
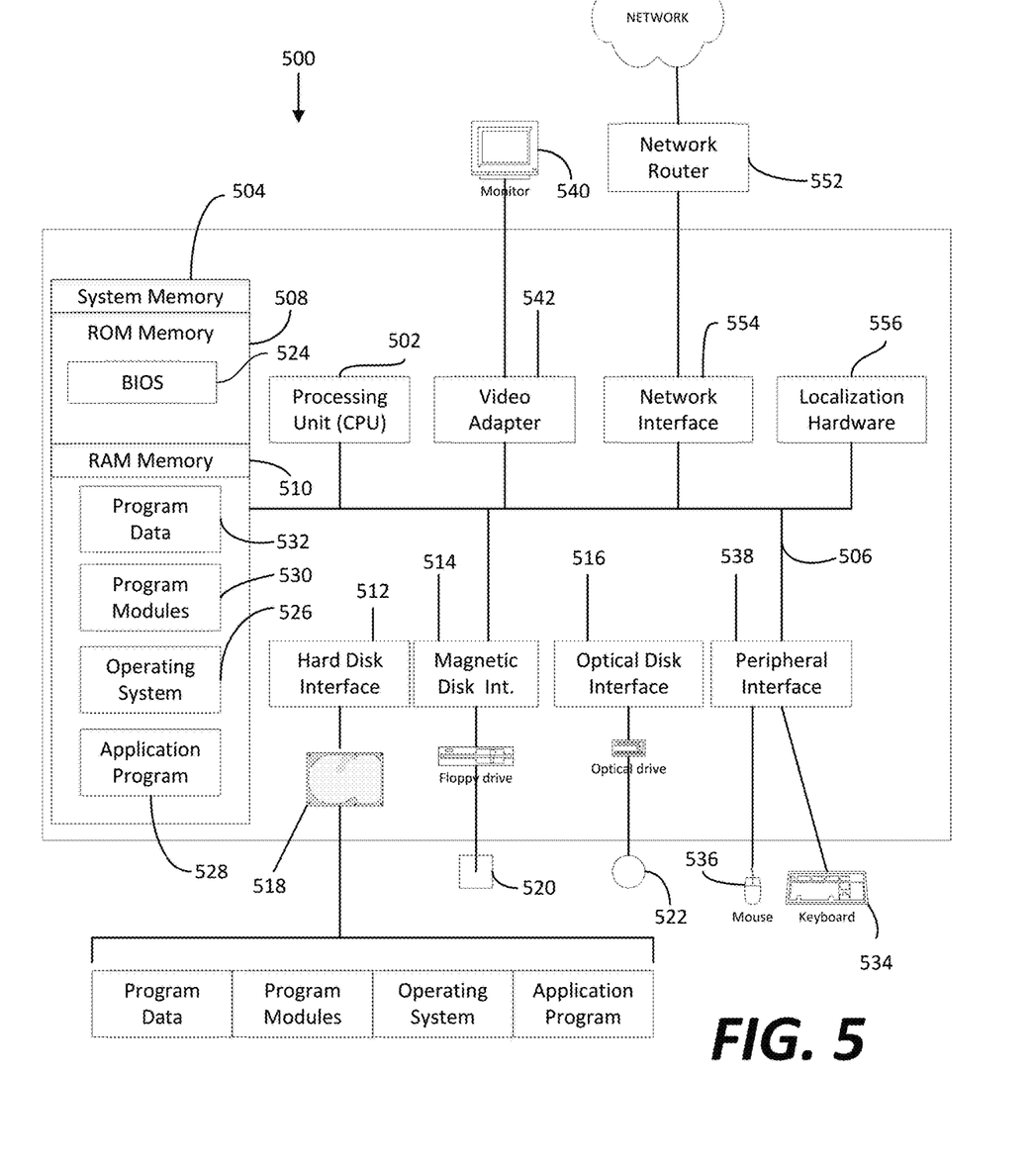
FIG. 5 is a diagrammatic view of an example of a user computing environment, according to an embodiment.

FIG. 5 is a diagrammatic view of an example embodiment of a user computing environment that includes a general purpose computing system environment 500, such as a desktop computer, laptop, smartphone, tablet, or any other such device having the ability to execute instructions, such as those stored within a non-transient, computer-readable medium. Furthermore, while described and illustrated in the context of a single computing system 100, those skilled in the art will also appreciate that the various tasks described hereinafter may be practiced in a distributed environment having multiple computing systems 500 linked via a local or wide-area network in which the executable instructions may be associated with and/or executed by one or more of multiple computing systems 500.

In its most basic configuration, computing system environment 500 typically includes at least one processing unit 502 and at least one memory 504, which may be linked via a bus 506. Depending on the exact configuration and type of computing system environment, memory 504 may be volatile (such as RAM 510), non-volatile (such as ROM 508, flash memory, etc.) or some combination of the two. Computing system environment 500 may have additional features and/or functionality. For example, computing system environment 500 may also include additional storage (removable and/or non-removable) including, but not limited to, magnetic or optical disks, tape drives and/or flash drives. Such additional memory devices may be made accessible to the computing system environment 500 by means of, for example, a hard disk drive interface 512, a magnetic disk drive interface 514, and/or an optical disk drive interface 516. As will be understood, these devices, which would be linked to the system bus 506, respectively, allow for reading from and writing to a hard disk 518, reading from or writing to a removable magnetic disk 520, and/or for reading from or writing to a removable optical disk 522, such as a CD/DVD ROM or other optical media. The drive interfaces and their associated computer-readable media allow for the nonvolatile storage of computer readable instructions, data structures, program modules and other data for the computing system environment 500. Those skilled in the art will further appreciate that other types of computer readable media that can store data may be used for this same purpose. Examples of such media devices include, but are not limited to, magnetic cassettes, flash memory cards, digital video-disks, Bernoulli cartridges, random access memories, nano-drives, memory sticks, other read/write and/or read-only memories and/or any other method or technology for storage of information such as computer readable instructions, data structures, program modules or other data. Any such computer storage media may be part of computing system environment 500.

A number of program modules may be stored in one or more of the memory/media devices. For example, a basic input/output system (BIOS) 524, containing the basic routines that help to transfer information between elements within the computing system environment 500, such as during start-up, may be stored in ROM 508. Similarly, RAM 510, hard drive 518, and/or peripheral memory devices may be used to store computer executable instructions comprising an operating system 526, one or more applications programs 528 (which may include the functionality of the product recommendation system 106 of FIG. 1, for example), other program modules 530, and/or program data 522. Still further, computer-executable instructions may be downloaded to the computing environment 500 as needed, for example, via a network connection.

An end-user may enter commands and information into the computing system environment 500 through input devices such as a keyboard 534 and/or a pointing device 536. While not illustrated, other input devices may include a microphone, a joystick, a game pad, a scanner, etc. These and other input devices would typically be connected to the processing unit 502 by means of a peripheral interface 538 which, in turn, would be coupled to bus 506. Input devices may be directly or indirectly connected to processor 502 via interfaces such as, for example, a parallel port, game port, firewire, or a universal serial bus (USB). To view information from the computing system environment 500, a monitor 540 or other type of display device may also be connected to bus 506 via an interface, such as via video adapter 532. In addition to the monitor 540, the computing system environment 500 may also include other peripheral output devices, not shown, such as speakers and printers.

The computing system environment 500 may also utilize logical connections to one or more computing system environments. Communications between the computing system environment 500 and the remote computing system environment may be exchanged via a further processing device, such a network router 552, that is responsible for network routing. Communications with the network router 552 may be performed via a network interface component 554. Thus, within such a networked environment, e.g., the Internet, World Wide Web, LAN, or other like type of wired or wireless network, it will be appreciated that program modules depicted relative to the computing system environment 500, or portions thereof, may be stored in the memory storage device(s) of the computing system environment 500.

The computing system environment 500 may also include localization hardware 586 for determining a location of the computing system environment 500. In embodiments, the localization hardware 556 may include, for example only, a GPS antenna, an RFID chip or reader, a WiFi antenna, or other computing hardware that may be used to capture or transmit signals that may be used to determine the location of the computing system environment 500.

The computing environment 500, or portions thereof, may comprise one or more components of the system 100 of FIG. 1, in embodiments.

While this disclosure has described certain embodiments, it will be understood that the claims are not intended to be limited to these embodiments except as explicitly recited in the claims. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure.

Some portions of the detailed descriptions of this disclosure have been presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various presently disclosed embodiments.

It should be borne in mind, however, that these terms are to be interpreted as referencing physical manipulations and quantities and are merely convenient labels that should be interpreted further in view of terms commonly used in the art. Unless specifically stated otherwise, as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers, or other such information storage, transmission, or display devices as described herein or otherwise understood to one of ordinary skill in the art.

What is claimed is:

1. A system, comprising:
a server; and
a product recommendation system,
   wherein the product recommendation system is in electronic communication with the server,
   wherein the product recommendation system comprises:
      a processor; and
      a memory storing instructions that, when executed by the processor, cause the system to perform a method, comprising:
         receiving, by the product recommendation system from a user device, a selection of an anchor product;
         training, by the processor, a machine learning model with product information for a plurality of products in a product database;
         generating, from the machine learning model, text embeddings comprising vector descriptions of text associated with each product of the plurality of products in the product database for each product of the plurality of products, wherein the machine learning model comprises a multi-stream network;
         calculating, by the product recommendation system, a similarity score between text embeddings of the anchor product and text embeddings of a plurality of products in a product database;
         calculating, by the product recommendation system, a similarity score between an image feature of the anchor product and an image feature of the plurality of products in the product database,
            wherein the image features comprise vector descriptions of color content of the images;
         calculating, by the product recommendation system, a weighted score between the two similarity scores as calculated for the anchor product and the plurality of products in the product database, wherein a weight of the similarity score between the image feature of the plurality of products in the product database and a weight of the similarity score between text embeddings of the anchor product and text embeddings of the plurality of products in the product database is varied using a product type determined from the text embeddings of the anchor product;
         selecting, by the product recommendation system, at least one of the products from the product database having a highest weighted score; and
         returning, to the user device by the product recommendation system, the at least one of the products as selected responsive to the selection of the anchor product, automatically causing the user device to display on a display of the user device the at least one of the products as selected responsive to the selection of the anchor product.

2. The system of claim 1, wherein the weighted score includes a text weight value based on a product type and an image weight value based on the product type.

3. The system of claim 2, comprising a first product type and a second product type, the first product type having a greater importance of visual features and a lower importance of textual features, the second product type having a lower importance of visual features and a greater importance of textual features.

4. The system of claim 3, wherein the text weight value of the first product type is lower than the text weight value of the second product type, and the image weight value of the first product type is greater than the image weight value of the second product type.

5. The system of claim 1, wherein the image feature includes a red-green-blue (RGB) color histogram on the image.

6. The system of claim 5, comprising determining, by the product recommendation system, the RGB color histogram for a foreground of the anchor product and the plurality of products in the product database.

7. The system of claim 5, wherein the RGB channels of the image include 8 bins per channel to obtain a 512-dimensional feature vector for the anchor product and the plurality of products in the product database.

8. The system of claim 1, wherein the selecting at least one of the products from the product database having a highest weighted score includes selecting a plurality of products and returning at least one of the plurality of products having a different product type than a product type of the anchor product.

9. A method, comprising:
receiving, by a product recommendation system from a user device, a selection of an anchor product;
training, by the product recommendation system, a machine learning model with product information for a plurality of products in a product database;
generating, from the machine learning model, text embeddings comprising vector descriptions of text associated with each product of the plurality of products in the product database for each product of the plurality of products, wherein the machine learning model comprises a multi-stream network;
calculating, by the product recommendation system, a similarity score between text embeddings of the anchor product and text embeddings of a plurality of products in a product database,
wherein the text embeddings comprise vector descriptions of text associated with each product of the plurality of products in the product database,
wherein the text embeddings for each product of the plurality of products are generated from a machine learning model, wherein the machine learning model is trained based on product information for each of the plurality of products in the product database for each of the plurality of products;
calculating, by the product recommendation system, a similarity score between an image feature of the anchor product and an image feature of the plurality of products in the product database;
calculating, by the product recommendation system, a weighted score between the two similarity scores as calculated for the anchor product and the plurality of products in the product database,
wherein a weight of the similarity score between the image feature of the plurality of products in the product database and a weight of the similarity score between text embeddings of the anchor product and text embeddings of the plurality of products in the product database is varied using a product type determined from the text embeddings of the anchor product;

selecting, by the product recommendation system, at least one of the products from the product database having a highest weighted score; and
returning, to the user device by the product recommendation system, the at least one of the products as selected responsive to the selection of the anchor product, automatically causing the user device to display on a display of the user device the at least one of the products as selected responsive to the selection of the anchor product.

10. The method of claim 9, wherein calculating the similarity score between text embeddings of the anchor product and text embeddings of the plurality of products in a database includes calculating a cosine similarity score between the text embeddings of the anchor product and the text embeddings of the plurality of products in the product database.

11. The method of claim 9, wherein calculating the similarity score between the image feature of the anchor product and the image feature of the plurality of products in the product database includes calculating a cosine similarity score between the image features of the anchor product and the image features of the plurality of products in the product database.

12. The method of claim 9, comprising separating the background and foreground of the image.

13. The method of claim 12, wherein the separating comprises a mean adaptive threshold.

14. The method of claim 12, wherein the image feature includes a red-green-blue (RGB) color histogram on the image, the method comprising determining the RGB color histogram for the foreground of the image following the separating the background and the foreground of the image.

15. The method of claim 14, wherein the RGB channels of the image include 8 bins per channel to obtain a 512-dimensional feature vector as the image feature for each image.

16. The method of claim 9, comprising filtering the of the products as selected responsive to selection of the anchor product to be a different product type than the product type of the anchor product.

17. A method, comprising:
receiving, by a product recommendation system from a user device, a selection of an anchor product;
generating, from a machine learning model, text embeddings comprising vector descriptions of text associated with each product of a plurality of products in a product database for each product of the plurality of products, wherein the machine learning model is trained based on product information for each of the plurality of products in the product database for each of the plurality of products, wherein the machine learning model comprises a multi-stream network;
calculating, by the product recommendation system, a cosine similarity score between text embeddings of the anchor product and text embeddings of the plurality of products in the product database;
calculating, by the product recommendation system, a cosine similarity score between an image feature of the anchor product and an image feature of a first subset of the plurality of products in the product database;
calculating, by the product recommendation system, a combined score between the two cosine similarity scores as calculated for the anchor product and the first subset of the plurality of products in the product database, wherein a weight of the cosine similarity score between the image feature of the anchor product and the image feature of the first subset of the plurality of products in the product database and a weight of the cosine similarity score between text embeddings of the anchor product and text embeddings of the anchor product and text embeddings of the plurality of products in the product database is varied using a product type determined from the text embeddings of the anchor product;

selecting, by the product recommendation system, at least one of the products from the product database having a highest combined score; and returning, to the user device by the product recommendation system, the at least one of the products as selected responsive to the selection of the anchor product, automatically causing the user device to display on a display of the user device the at least one of the products as selected responsive to the selection of the anchor product.

18. The method of claim 17, wherein the first subset of the plurality of products includes a selection of the plurality of products having a highest cosine similarity score between the text embeddings of the anchor product and the plurality of products.

19. The method of claim 17, wherein the combined score is weighted and includes a text weight value based on the product type and an image weight value based on the product type.

20. The method of claim 17, comprising filtering the products as selected responsive to selection of the anchor product to be a different product type than a product type of the anchor product.

* * * * *